(12) United States Patent
Mizutani

(10) Patent No.: US 6,519,514 B2
(45) Date of Patent: Feb. 11, 2003

(54) AUTOMATIC TRAVEL CONTROL APPARATUS FOR VEHICLE

(75) Inventor: Mami Mizutani, Hachioji (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 0 days.

(21) Appl. No.: 09/800,467

(22) Filed: Mar. 8, 2001

(65) Prior Publication Data

US 2001/0023380 A1 Sep. 20, 2001

(30) Foreign Application Priority Data

Mar. 10, 2000 (JP) ..................... 2000-066052

(51) Int. Cl.$^7$ ............................. G06G 7/76
(52) U.S. Cl. ................ 701/23; 701/11; 340/988; 340/991
(58) Field of Search ............ 701/23, 1, 2, 11, 701/200, 201, 203, 213; 340/988, 991

(56) References Cited

U.S. PATENT DOCUMENTS 5,657,226 A * 8/1997 Shin et al. ................ 701/23

FOREIGN PATENT DOCUMENTS

| JP | 7-160995 | 6/1995 |
| JP | 10-105232 | 4/1998 |
| JP | 10-105892 | 4/1998 |

OTHER PUBLICATIONS

Igor E. Paromtchik, et al., Proceedings of the 1996 IEEE International Conference on Robotics and Automation, pp. 3117–3122, "Motion Generation and Control for Parking an Autonomous Vehicle", Apr. 1996.

Andreas Simon, et al., International Conference on Intelligent Transportation Systems, pp. 429–434, "Vehicle Guidance for an Autonomous Vehicle", Oct. 5–8, 1999.

* cited by examiner

Primary Examiner—Thomas G. Black
Assistant Examiner—Arthur D. Donnelly
(74) Attorney, Agent, or Firm—Oblon, Spivak, McClelland, Maier & Neustadt, P.C.

(57) ABSTRACT

An apparatus includes means for holding data which pertain to specifications and data of a vehicle, means for obtaining information of a path the vehicle is to travel, which consists of position, orientation, and velocity data, and is given by point information, a path computing section for computing a path equation including equations of continuous straight lines and arcs and a velocity pattern, which pertain to automatic travel, on the basis of the held data and the path information, an absolute position orientation angle detection section for detecting the absolute position and absolute orientation angle of the vehicle, and means for controlling the steering unit to track the path equation on the basis of the path equation, and the absolute position and orientation angle, and controlling the drive unit to track the velocity pattern on the basis of the velocity pattern, and the vehicle velocity.

18 Claims, 10 Drawing Sheets

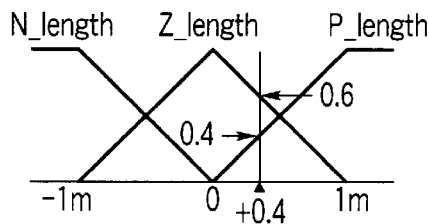
MEMBERSHIP FUNCTION OF
DISTANCE DEFLECTION
FIG. 20A
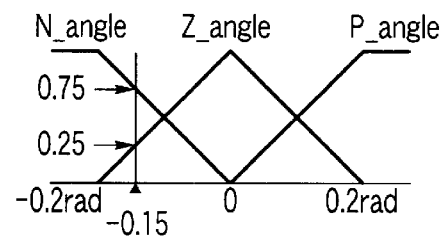
MEMBERSHIP FUNCTION OF
ORIENTATION ANGLE
DEFLECTION
FIG. 20B
|  | N_length 0 | Z_length 0.6 | P_length 0.4 |
|---|---|---|---|
| N_angle 0.75 | Negative-Big 0 | Negative-Small 0.6 | Zero 0.4 |
| Z_angle 0.25 | Negative-Small 0 | Zero 0.25 | Plus-Small 0.25 |
| P_angle 0 | Zero 0 | Plus-Small 0 | Plus-Big 0 |
FIG. 21
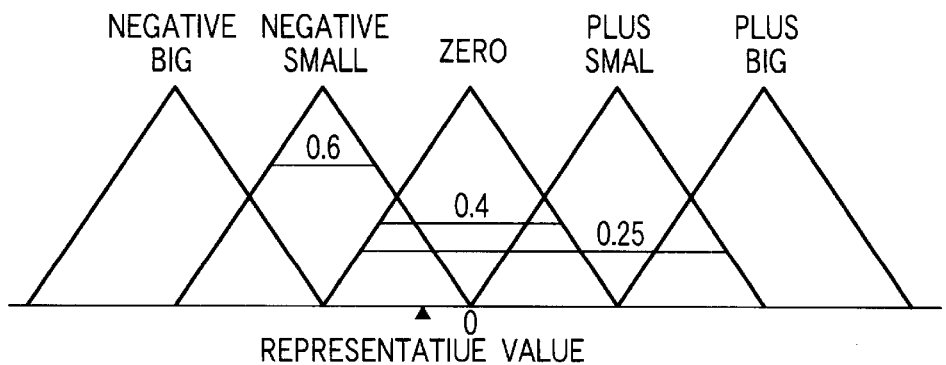
FIG. 22

AUTOMATIC TRAVEL CONTROL APPARATUS FOR VEHICLE

CROSS-REFERENCE TO RELATED APPLICATIONS

This application is based upon and claims the benefit of priority from the prior Japanese Patent Application No. 2000-066052, filed Mar. 10, 2000, the entire contents of which are incorporated herein by reference.

BACKGROUND OF THE INVENTION

The present invention relates to an automatic travel control apparatus for a vehicle for making a vehicle automatically or autonomously travel along a given path and, more particularly, to an automatic travel control apparatus for a vehicle, which can assure very high traceability and stability.

Conventionally, in the field of travel control of a vehicle, as a technique that pertains to lane change and obstacle avoidance action, a scheme for computing a steering angle by feedforward control on the basis of the goal angle, the distance to an obstacle, or the like is known, as described in, e.g., "Jpn. Pat. Appln. KOKAI Publication No. 7-160995".

In a method of computing a steering angle by feedback control, the steering angle is computed using the vehicle declination and side displacement amount as inputs.

FIG. 1 is a block diagram showing an example of the method of computing the steering angle by a feedback computation.

That is, as shown in FIG. 1, the vehicle declination and side displacement amount are respectively multiplied by gains, and these products are added to obtain a steering angle command.

On the other hand, as a technique that pertains to path track automatic travel control, a method of embedding magnetic markers in the road surface on which a vehicle travels, and tracking the magnetic markers is known, as described in "Jpn. Pat. Appln. KOKAI Publication No. 10-105892" or "Jpn. Pat. Appln. KOKAI Publication No. 10-105232". In this method, a computation is made based on the distance from the path or the like.

However, in the method described in "Jpn. Pat. Appln. KOKAI Publication No. 7-160995", the feedforward computation stands only under the condition of constant velocity, and a steering angle command is output by time management.

In this case, when a velocity corresponding to the command is not output, a future vehicle body state is indeterminable, and such control is not appropriate.

As for the steering angle command obtained by the feedback computation using the side displacement amount and vehicle declination, if the gains are constant, since two inputs are used, the output controlled variable may diverge depending on the magnitudes of the inputs, and stable control is hard to attain.

On the other hand, in the method using the magnetic markers described in "Jpn. Pat. Appln. KOKAI Publication No. 10-105892" or "Jpn. Pat. Appln. KOKAI Publication No. 10-105232", magnetic markers must be embedded in the road surface.

Also, when a vehicle deviates from the magnetic markers, it becomes impossible to continue control.

Furthermore, an accurate vehicle position orientation angle cannot be detected based on the magnetic markers.

BRIEF SUMMARY OF THE INVENTION

It is an object of the present invention to provide an automatic travel control apparatus for a vehicle, which can realize autopilot of a vehicle with very high traceability and stability.

In order to achieve the above object, according to the present invention, an automatic travel control apparatus for controlling a vehicle which mounts a controllable steering unit and drive unit to make it automatically travel according to a given path, comprises storage means for holding data which pertain to specifications and data of the vehicle, path information obtaining means for obtaining path information of a path the vehicle is to travel, which consists of position, orientation, and velocity data, and is given by point information, path computing means for computing a path equation including equations of continuous straight lines and arcs and a velocity pattern, which pertain to automatic travel, on the basis of the data held by the storage means and the path information obtained by the path information obtaining means, absolute position-orientation angle detection means for detecting an absolute position and absolute orientation angle of the vehicle, steering control means for controlling the steering unit to track the path equation on the basis of the path equation computed by the path computing means, and the absolute position and absolute orientation angle of the vehicle detected by the absolute position-orientation angle detection means, and a drive control unit for controlling the drive unit to track the velocity pattern on the basis of the velocity pattern computed by the path computing means and a velocity of the vehicle.

In the automatic travel control apparatus for a vehicle according to the present invention, since path or route information along which the vehicle is to travel is given in advance to instruct the coordinates of the path the vehicle is to travel, and the vehicle orientation angle at that position, the feedback control of steering (direction) and drive (velocity) of the vehicle is made using the detected absolute position and absolute orientation angle of the vehicle, thus realizing automatic travel of a vehicle with high traceability.

In this way, automatic steering & velocity control is made, and automatic travel of a vehicle with very high traceability and stability can be realized.

Furthermore, the path information obtaining means comprises a management center for managing travel of the vehicle, and supplying path information of the path the vehicle is to travel, means for making two-way communications between the management center and the vehicle, and means for receiving the path information of the path the vehicle is to travel, which is supplied from the management center, and when the vehicle transmits information such as a current vehicle position, goal, and the like to the management center, the management center transmits path information to the goal to the vehicle.

Therefore, in the automatic travel control apparatus for a vehicle according to the present invention, since the vehicle designates/transmits a goal, path information such as coordinate positions where the path changes (right and left traverses, lane changes, and the like) in the path to the goal, the velocity at that coordinate position, the radius of gyration upon traverse, and the like is sent from the management center. Then, a continuous path equation is computed based on such path information. The vehicle can transmit information such as the current vehicle position, goal, and the like to the management center.

According to the present invention, the path information obtaining means comprises means for designating a goal to which the vehicle is to travel, means for holding map information to the goal, and means for computing and selecting a path to the designated goal on the basis of the held map information, and when a goal of the vehicle is designated, path information to the goal is computed.

Therefore, according to the present invention, when the goal is designated, path information such as a path to the goal, the coordinate positions where the path changes (right and left traverses, lane changes, and the like), the velocity at that coordinate position, the radius of gyration upon traverse, and the like is computed, and the path equation is computed based on the computed information.

Furthermore, according to the present invention, the steering control means comprises means for computing a positional deflection as a deflection between the path equation computed by the path computing means, and a current absolute position of the vehicle, means for computing an orientation angle deflection as a deflection between a goal orientation angle of the vehicle in the path equation computed by the path computing means, and a current absolute orientation angle of the vehicle, means for computing a steering angle command of the vehicle to make the positional deflection and orientation angle deflection close to zero, and means for controlling a steering angle of the vehicle in response to the steering angle command of the vehicle.

Therefore, according to the present invention, the current positional deflection and orientation angle deflection of the vehicle are accurately computed, and a steering angle command of the vehicle is computed to make these deflections closer to zero, thus controlling the steering angle of the vehicle.

Moreover, the apparatus further comprises means for transmitting travel path information including obstacle information such as accident information, roadwork information, and the like, which are associated with a leading vehicle, to the management center as history information, and means for updating path information of the path the vehicle is to travel, which is to be supplied to a trailing vehicle, on the basis of the transmitted history information.

Therefore, according to the present invention, since travel path information including obstacle information that pertains to a leading vehicle is transmitted to the management center as history information, the management center updates information of the path the vehicle is to travel, which is supplied to a trailing vehicle to reflect obstacles upon travel of the leading vehicle in travel control of the trailing vehicle, thus realizing automatic travel of a vehicle with higher reliability, which considers traffic accidents, roadwork, and the like.

According to the present invention, a feedback computation upon controlling the steering unit to track the path equation or upon controlling the drive device to track the velocity pattern uses fuzzy reasoning.

Therefore, when fuzzy reasoning is used in the feedback computation upon executing steering control and drive control, since gains are variable, the vehicle position and orientation angle can be controlled without any interference, thus realizing more stable travel control.

As described above, according to the automatic travel control apparatus for a vehicle of the present invention, the absolute position and absolute orientation angle of the vehicle are obtained, information of a path the vehicle is to travel is acquired, a continuous path equation and velocity pattern, which pertain to automatic travel, are computed on the basis of the path information, and direction control by the steering unit and velocity control by the drive unit are made to track these path equation and velocity pattern. Therefore, automatic steering & drive control is achieved, and automatic travel of a vehicle with very high traceability and stability can be realized.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIGS. 20A and 20B show setup examples of antecedent part membership functions of a fuzzy method in the automatic travel control apparatus for a vehicle of the fourth embodiment;

FIG. 21 shows an example of a fuzzy method rule table in the automatic travel control apparatus for a vehicle of the fourth embodiment; and FIG. 22 shows a setup example of a consequent part membership function of a fuzzy method in the automatic travel control apparatus for a vehicle of the fourth embodiment.

DETAILED DESCRIPTION OF THE INVENTION

The present invention solves the former problem mentioned above by adopting a feedback computation in place of the aforementioned conventional feedforward computation, and using fuzzy reasoning in the feedback computation as needed.

Also, the present invention solves the latter problem mentioned above by using sensors such as a GPS, gyro, and the like to identify the absolute position and orientation angle of a vehicle on the absolute coordinate system with reference to the Earth coordinates and to obtain a continuous path equation, and building a control system that tracks the path equation.

That is, an automatic travel control apparatus for a vehicle according to the present invention acquires information of a path a vehicle is to travel in, e.g., a system that identifies the absolute position and orientation angle of the self vehicle by a position orientation identification system, computes a continuous path equation and velocity pattern that pertains to automatic navigation on the basis of the path information, and automatically controls a controllable steering unit and drive unit equipped in the self vehicle.

Embodiments of the present invention based on the above principle will be described in detail hereinafter with reference to the accompanying drawings.

(First Embodiment)

Figure 2:
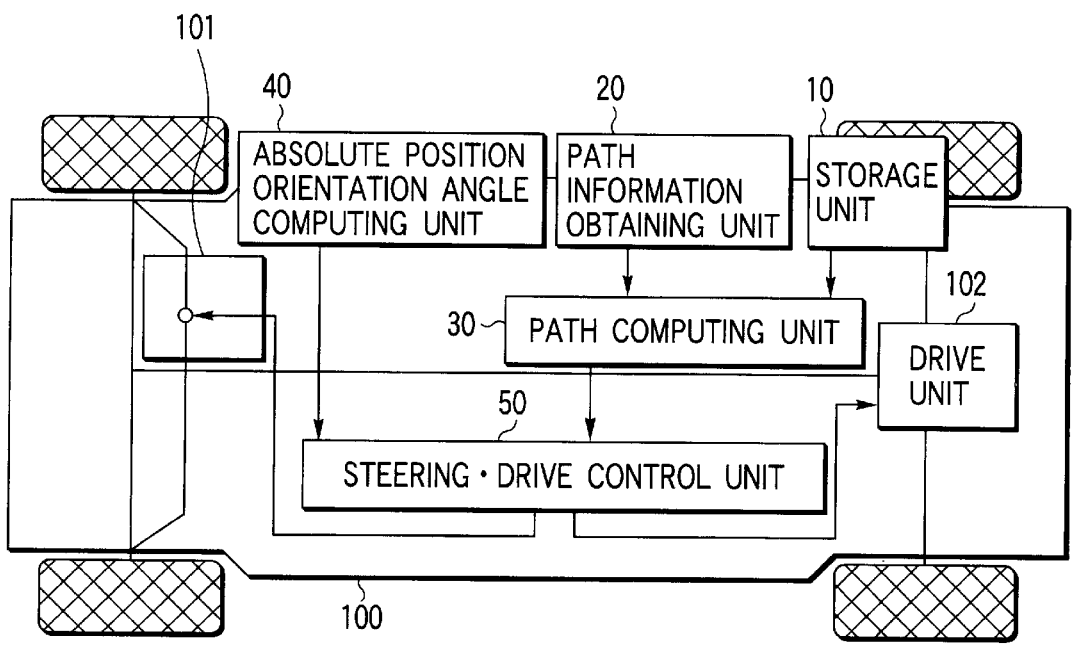
FIG. 2 is a block diagram showing the first embodiment of an automatic travel control apparatus for a vehicle according to the present invention.

FIG. 2 is a block diagram showing an example of the arrangement of an automatic travel control apparatus for a vehicle according to this embodiment.

Referring to FIG. 2, a vehicle 100 comprises a controllable steering unit 101 and drive unit 102.

As the steering unit 101, a unit for rotating a steering wheel shaft by attaching a motor to a steering wheel itself, a unit for directly rotating a pinion gear and the like of a steering wheel, and the like are known.

For example, by controlling the position of the motor that rotates the steering wheel shaft, steering control of the vehicle 100 is attained.

As the drive unit 102, a motor-driven electromobile is known.

When an electromobile is to be driven, a command to the drive unit 102 is a torque command to a motor. Based on this torque information, drive control of an inverter and the like is made.

On the other hand, an automatic travel control apparatus of this embodiment comprises a storage unit 10, path information obtaining unit 20, path computing unit 30, absolute position orientation angle computing unit 40, and steering drive control unit 50, and controls the vehicle 100 to make it automatically travel in accordance with a given path, as shown in FIG. 2.

The storage unit 10 holds data that pertains to specifications and data of the vehicle 100.

The path information obtaining unit 20 obtains path information which includes position, orientation, and velocity data, is given by point information, and indicates a path the vehicle is to travel.

The path computing unit 30 computes a path equation made up of equations of continuous straight lines and arcs which pertain to automatic travel, on the basis of the data held in the storage unit 10 and the path information obtained by the path information obtaining unit 20.

The absolute position orientation angle computing unit 40 identifies and computes the absolute position and absolute orientation angle of the vehicle 100.

The steering drive control unit 50 has a steering control function of controlling the steering unit 101 to make it track the path equation on the basis of the path equation computed by the path computing unit 30 and the absolute position and absolute orientation angle of the vehicle 100 obtained by the absolute position orientation angle computing unit 40, and a drive function of controlling the drive unit 102 to make it track the velocity pattern on the basis of the velocity pattern computed by the path computing unit 30 and the velocity of the vehicle 100.

Note that at least some of the storage unit 10, path information obtaining unit 20, path computing unit 30, absolute position orientation angle computing unit 40, and steering drive control unit 50 are mounted in one or a plurality of PCs (personal computers) or an arithmetic board that mounts arithmetic chips such as a CPU, DSP (Digital Signal Processor), and the like, or are integrated in an existing navigation system.

Especially when a plurality of PCs are used, data intercommunications can be made via, e.g., a network for vehicles.

The operation of the automatic travel control apparatus for a vehicle according to this embodiment with the aforementioned arrangement will be described below using FIGS. 3 to 10.

In FIG. 2, the storage unit 10 holds data that pertain to specifications and data such as the sizes (the total length, total width, and the like) of the vehicle 100, the minimum radius of gyration, and the like, and supplies the data to the path computing unit 30.

Figure 3:
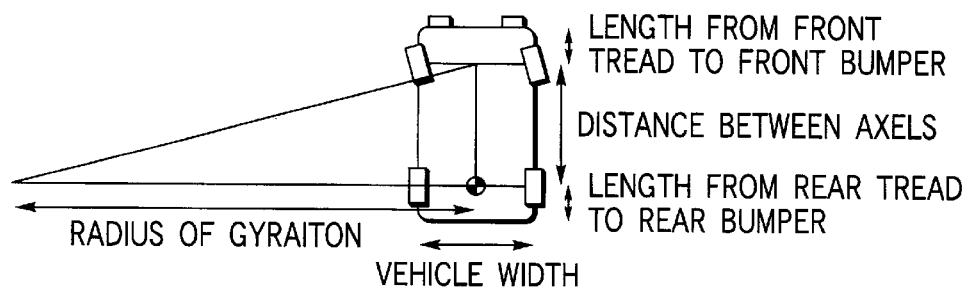
FIG. 3 shows an example of specifications and data of a vehicle in the automatic travel control apparatus for a vehicle of the first embodiment.

FIG. 3 shows a setup example of data held in the storage unit 10.

As the data that pertain to specifications and data of the vehicle 100, the vehicle width, distance between axles, lengths from front and rear treads to front and rear bumpers, the correlation between the radius of gyration and steering angle, and the like are set.

The path information obtaining unit 20 obtains information of the path the vehicle 100 is to travel, and supplies this path information to the path computing unit 30 that computes an actual path equation.

The vehicle 100 can receive such path information from the road surface or other facilities, or can compute the information from internal map information.

The path computing unit 30 computes a path equation which is made up equations of continuous straight lines and arcs, and a velocity pattern, which pertains to automatic maneuvering, on the basis of the data supplied from the storage unit 10, and the path information of the vehicle 100 which is supplied from the path information obtaining unit 20.

As the path equation, a path equation in the form of x- and y-coordinates as point information is generated. The generated path equation and velocity pattern are supplied as instructed path information to the steering drive control unit 50.

The absolute position orientation angle computing unit 40 constructs position identification means of the present invention. That is, the unit identifies data which pertain to the absolute position and absolute orientation angle of the vehicle 100, and supplies these data to the steering drive control unit 50.

Note that the absolute position means not a position relative to, e.g., a lane, but a position with respect to a given fixed coordinate origin.

For example, the absolute position means a coordinate system having a given place of a town as an origin, or the Earth coordinate system used in, e.g., a GPS or the like.

The absolute orientation angle is an angle (vehicle body orientation angle) with respect to the coordinate axes (X- and Y-axes) of the absolute coordinate system defined as described above.

For example, the absolute orientation angle can be expressed by an angle of ±180° (or π radian) with reference to the X-axis.

Note that a reference position of the vehicle 100 in this absolute position coordinate system is set at the central position of the rear axle in the widthwise direction of the vehicle for the sake of simplicity. However, the present invention is not limited to such specific position, but the reference position may be set at any other positions.

In this embodiment, a reference orientation angle is set on the axle for the sake of simplicity, but the present invention is not limited to such specific angle.

The aforementioned operation will be described in more detail below.

Figure 4:
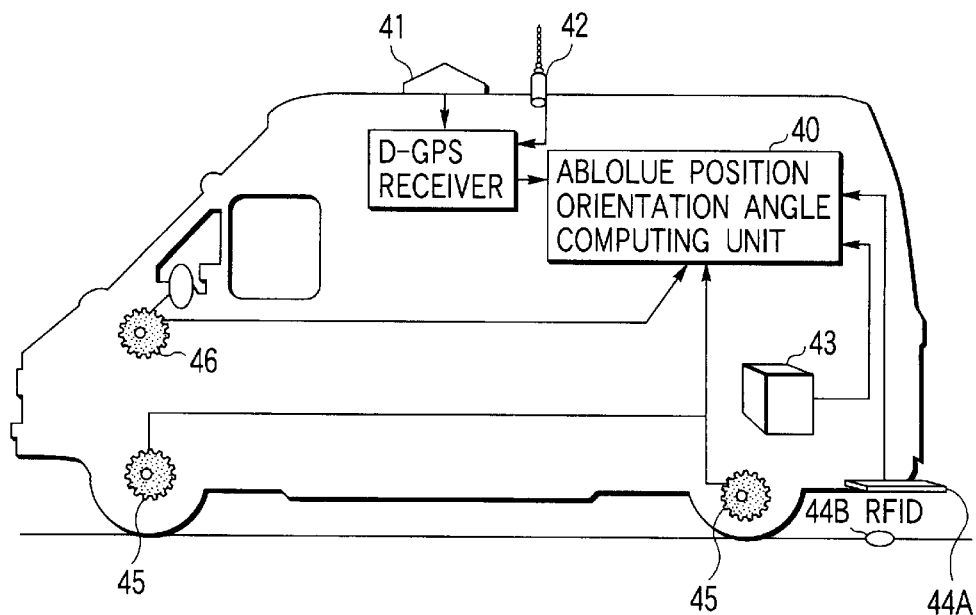
FIG. 4 shows an example of the arrangement of sensors used to identify the position and orientation in the automatic travel control apparatus for a vehicle of the first embodiment.

FIG. 4 shows sensors that construct the absolute position orientation angle computing unit 40.

As shown in FIG. 4, the apparatus comprises, as sensors, a GPS receiver 41, differential signal receiver 42, acceleration sensor gyro 43, RFID receiver 44A, RFID 44B, vehicle velocity sensor 45, and steering sensor 46.

Note that details of these sensors are described in, e.g., "Japanese Patent Application No. 11-283570" already filed by the present applicant.

The steering drive control unit 50 controls the position, velocity, and steering angle of the steering unit 101 and drive unit 102 mounted in the vehicle 100 using the data which are supplied from the absolute position orientation angle computing unit 40 and pertain to the absolute position and absolute orientation angle of the vehicle 100, and the instructed path information supplied form the path computing unit 30, so as to control the vehicle to make it automatically travel along the instructed path, thus achieving automatic steering drive control of the vehicle 100.

Figure 5:
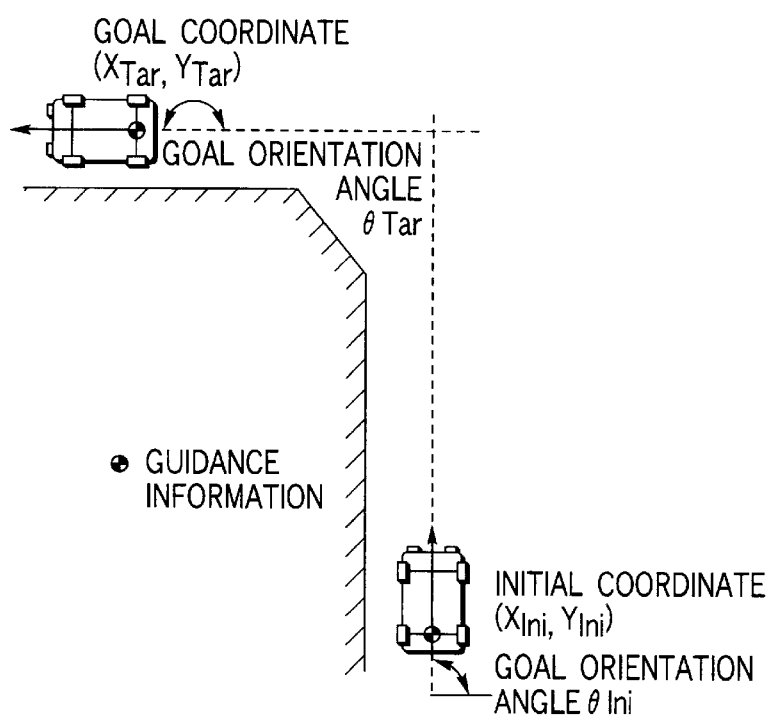
FIG. 5 shows an example of path information (upon left traverse) in the automatic travel control apparatus for a vehicle of the first embodiment.

FIG. 5 shows an example of path information obtained by the path information obtaining unit 20. Note that FIG. 5 shows an example upon left traverse.

Assume that an initial coordinate position $(X_{Ini}, Y_{Ini})$, an orientation angle $\theta_{Ini}$ and velocity $V_{Ini}$ at that coordinate position, a goal coordinate position $(X_{Tar}, Y_{Tar})$, an orientation angle $\theta_{Tar}$ and velocity $V_{Tar}$ at that coordinate position, and a radius R of gyration are obtained.

Figure 6:
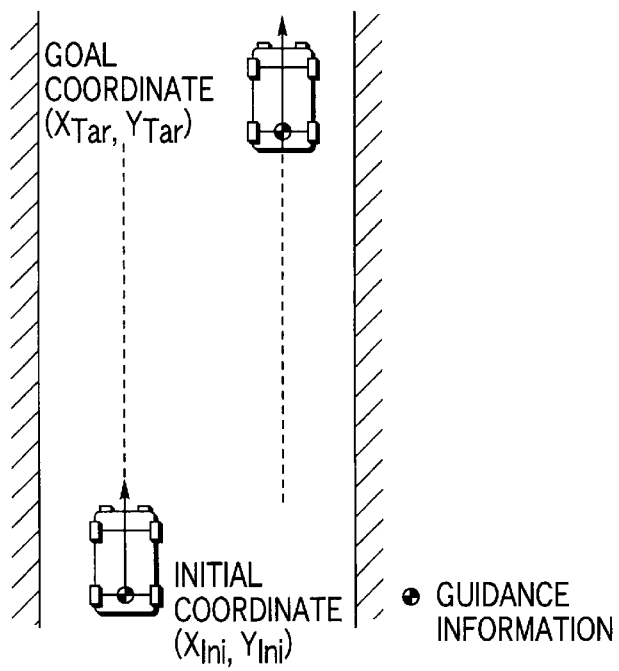
FIG. 6 shows an example of path information (upon lane change) in the automatic travel control apparatus for a vehicle of the first embodiment.

The same applies to path information upon lane change shown in FIG. 6. The coordinate orientation angle information is expressed by the absolute coordinate position.

When such information is obtained, the path is described by an equation to facilitate holding and supply of the instructed path information to the steering drive control unit 50.

Computation examples will be described below.

That is, when the coordinate positions and orientation angles are given, a travel path at that time can be described by equations of straight lines:

$$Y = A_1 * X + B_1$$

$$A_1 = \tan(\theta_{Ini})$$

$$B_1 = Y_{Ini} - A_0 * X_{Ini} \quad (1)$$

$$Y = A_2 * X + B_2$$

$$A_2 = \tan(\theta_{Tar}) \quad (2)$$

$$B_2 = Y_{Tar} - A_2 * X_{Tar} \quad (2)$$

An intersection (Xcp, Ycp) of the straight line equations based on the initial and goal coordinate positions is obtained, and traverse start and end points of an arc path corresponding to the radius of gyration are computed.

A distance Lcp from the intersection to the start point is given by:

$$Lcp = R * \tan\left(\frac{\theta_{Tar} - \theta_{Ini}}{2}\right) \quad (3)$$

Figure 7:
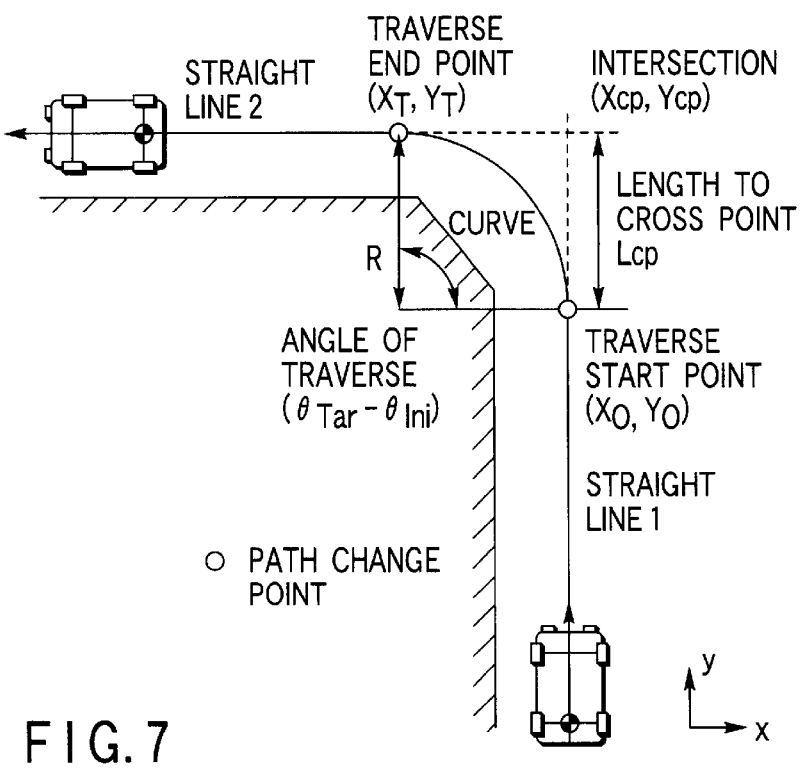
FIG. 7 shows an example of a continuous path equation (upon left traverse) in the automatic travel control apparatus for a vehicle of the first embodiment.

A point which is located on straight line (1) and is separated distance Lcp from the intersection is a start coordinate position $(X_O, Y_O)$ A point which is located on straight line (2) and is separated distance Lcp from the intersection is an end coordinate position $(X_T, Y_T)$ The path shown in FIG. 5 is described by equations of straight lines and an arc shown in FIG. 7.

Upon lane change shown in FIG. 6, a path is computed as follows.

Figure 8:
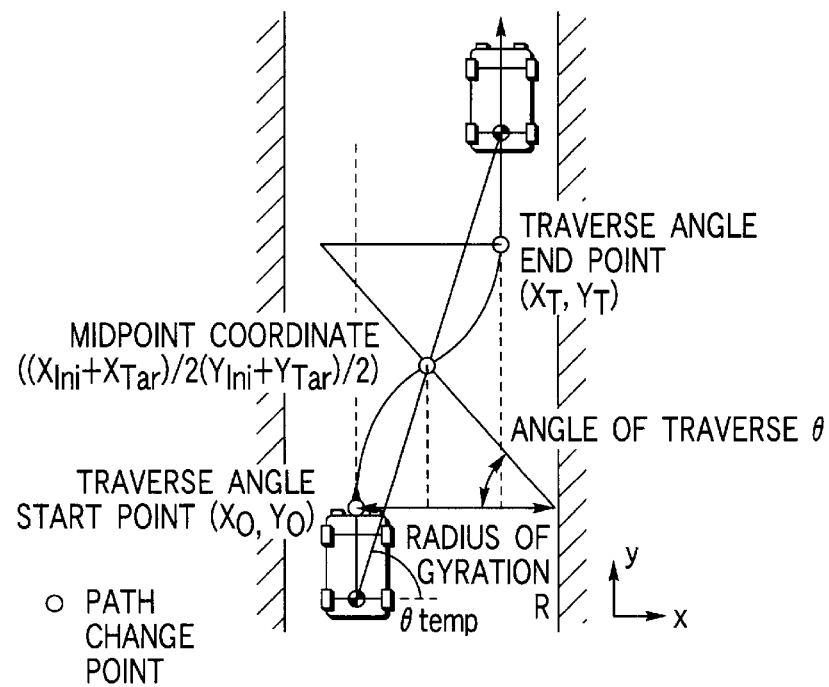
FIG. 8 shows an example of a continuous path equation (upon lane change) in the automatic travel control apparatus for a vehicle of the first embodiment.

As shown in FIG. 8, the path is described by equations of straight lines and arcs as in FIG. 7.

A distance d between two straight lines is computed from initial and goal positions.

A straight line that passes through an initial coordinate position $(X_{Ini}, Y_{Ini})$ and goal coordinate position $(X_{Tar}, Y_{Tar})$ is computed, and the distance d between the two straight lines can be computed from an angle $\theta_{temp}$ with respect to the x-axis at that time, and a distance L between two points.

The straight line that passes through the initial and goal coordinate position is given by equations (1) above.

$$Y = A_2 * X + B_2 \quad (4)$$

$$A_2 = \frac{Y_{Tar} - Y_{Ini}}{X_{Tar} - X_{Ini}}$$

$$B_2 = \frac{Y_{Tar} * X_{Ini} - Y_{Ini} * X_{Tar}}{X_{Tar} - X_{Ini}}$$

A distance d_line between the straight lines at that time is described by equation (2).

$$d\_line = L * \cos(\theta_{temp})$$

$$L = \sqrt{(X_{Tar} - X_{Ini})^2 + (Y_{Tar} - Y_{Ini})^2}$$

$$\theta_{temp} = a\tan(A_2) \quad (5)$$

A midpoint coordinate position $(X_m, Y_m)$ between the initial and goal positions is computed. This midpoint coordinate position is defined to be path change point 2.

Traverse start and end points are then computed.

Since equations (6) hold, a start coordinate position $(X_O, Y_O)$ can be computed by equations (7):

$$\frac{d\_line}{2} = R - R * \cos\theta \quad (6)$$

$$\theta = a\cos\left(1 - \frac{d\_line}{2 * R}\right)$$

$$X_0 = X_m - \frac{d\_line}{2}$$

$$Y_0 = Y_m - R * \sin\theta \quad (7)$$

Since the angles of traverse remain the same, a traverse end coordinate position $(X_T, Y_T)$ is given by:

$$X_T = X_m + \frac{d\_line}{2} \quad (8)$$

$$Y_T = Y_m + R * \sin\theta$$

In this way, since the path is expressed by the straight lines and arcs, the orientation angle of the vehicle 100 with respect to the position can be obtained without preparing any table of path patterns.

The vehicle 100 is controlled to track this path.

Figure 9:
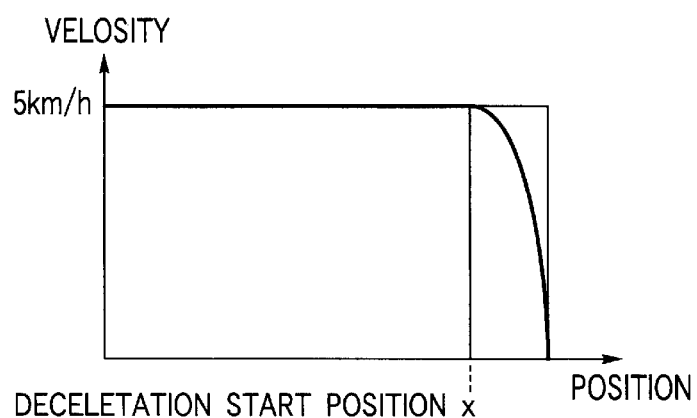
FIG. 9 is a graph showing an example of a velocity pattern in the automatic travel control apparatus for a vehicle of the first embodiment.

As for a velocity, when the vehicle is instructed to travel at, e.g., an initial velocity $V_O=5$ km/h, and to decelerate to reach 0 km/h at the goal coordinate position, a velocity pattern shown in FIG. 9 is generated.

For example, a deceleration rate β is specified in advance or is included in an externally received signal. At this time, the deceleration start position is separated a distance X given by:

$$x = \frac{V_0^2}{2 * \beta} \quad (9)$$

from the goal coordinate position.

When the vehicle has reached a position the distance X to the goal coordinate position, it is controlled to track a deceleration pattern.

Since the path and velocity commands are computed, as described above, the steering angle and velocity of the vehicle 100 are controlled to track them as instructed goal values.

Figure 10:
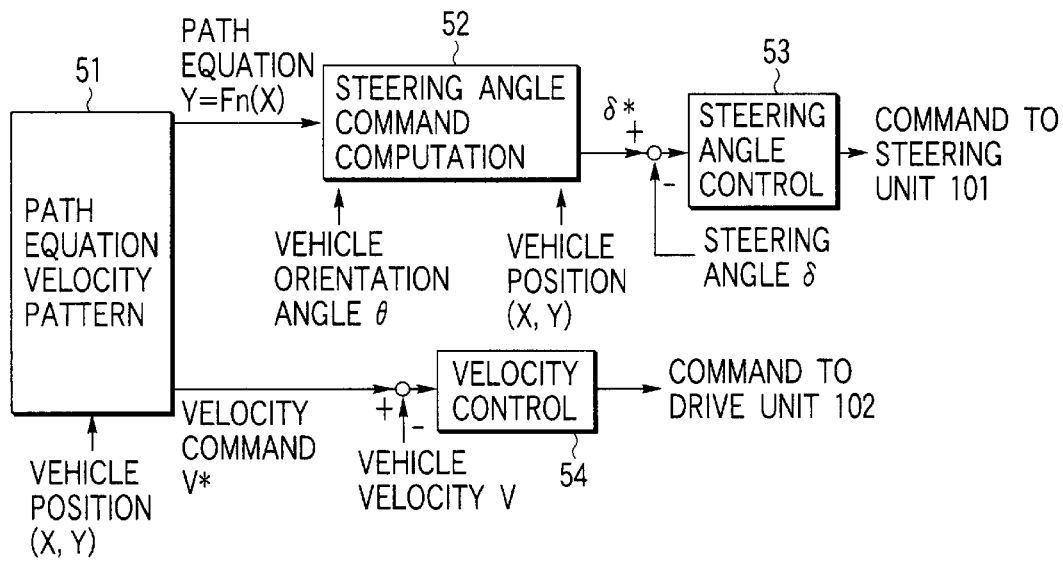
FIG. 10 is a block diagram showing an example of automatic travel control in the automatic travel control apparatus for a vehicle of the first embodiment.

FIG. 10 is a block diagram showing an example of the control arrangement in the steering velocity control unit 50.

Referring to FIG. 10, a path equation velocity pattern holding unit 51 holds the path equation and velocity pattern supplied from the path computing unit 30.

By inputting the current position of the vehicle 100 with respect to the path equation, a path equation corresponding to the current position of the vehicle 100 is selected, and a velocity command is output.

By comparing the path equation Y=Fn(X) with the current position and orientation angle of the vehicle 100, a steering angle command computing unit 52 of the vehicle computes a steering angle command δ*.

Steering angle control 53 is made using this steering angle command δ* and an actual steering angle δ to compute a command to the steering unit 101.

Since the steering angle of the vehicle 100 has nearly one-to-one correspondence with a steering wheel angle, the steering angle command may be converted into a steering wheel angle command.

A velocity control unit 54 compares a velocity command V* with the actual velocity V of the vehicle 100, and computes a command to the drive unit 102 so as to output a velocity so that the velocity V tracks the velocity command V*.

In this manner, upon inputting the path information, the absolute position orientation angle of the vehicle 100 are identified, a continuous path equation and velocity pattern are computed, and the steering velocity control according to the path equation and velocity pattern can be made, thus realizing automatic travel of the vehicle 100 with high traceability and stability.

As described above, in the automatic travel control apparatus for a vehicle according to this embodiment, the absolute position and absolute orientation angle of the vehicle 100 are obtained, information of the path the vehicle 100 is to travel is acquired, a continuous path equation and velocity pattern that pertain to automatic travel are computed on the basis of the path information, and the direction control of the steering unit 101 and the velocity control of the drive unit 102 are made by the feedback computation to track the path equation and velocity pattern. Therefore, automatic travel of a vehicle with very high traceability and stability can be realized.

(Second Embodiment)

Figure 1:
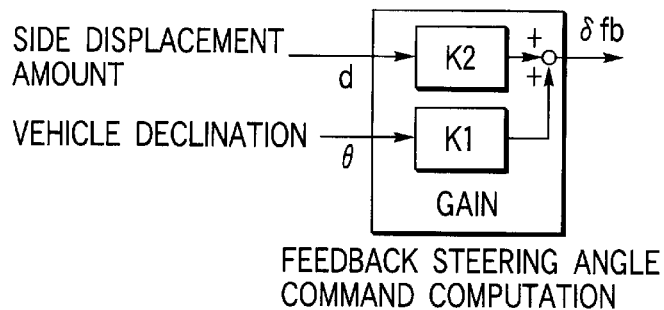
FIG. 1 is a block diagram showing an example of the conventional method that obtains the steering angle by feedback control.
Figure 11:
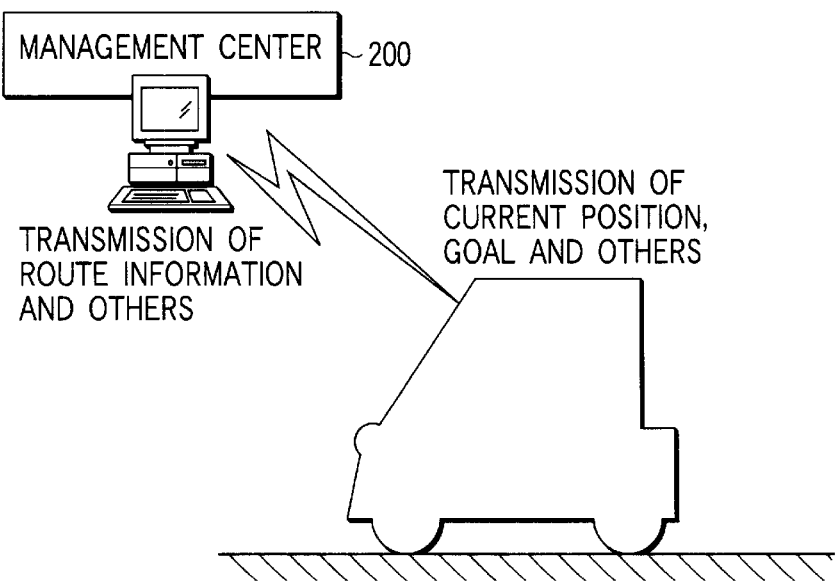
FIG. 11 is a schematic view showing an example of the arrangement of principal part of an automatic travel control apparatus for a vehicle according to the second embodiment of the present invention.

FIG. 11 is a schematic view showing an example of the arrangement of principal part of an automatic travel control apparatus according to this embodiment. The same reference numerals in FIG. 11 denote substantially the same parts as in FIG. 1, a detailed description thereof will be omitted, and only differences will be explained below.

That is, in this embodiment, the path information obtaining unit 20 in the automatic travel control apparatus for a vehicle in the first embodiment mentioned above comprises a management center 200 for managing travel of the vehicle 100, and supplying information of the path or route the vehicle 100 is to travel, communication means such as a transmission line or the like for making two-way communications between the management center 200 and vehicle 100, and means for receiving information of the path the vehicle 100 is to be travel from the management center 200. When the vehicle 100 transmits information such as the current vehicle position, goal, and the like to the management center 200, the management center 200 transmits path information to the goal to the vehicle 100.

Note that FIG. 11 shows an automatic travel model of the vehicle 100 in a town.

As described above, in the automatic travel control apparatus for a vehicle of this embodiment with the above arrangement, since the vehicle 100 designates and transmits a goal, the management center 200 sends, to the vehicle, path information including the coordinate positions of changes in path such as right and left traverses, lane change, and the like along the path to the goal, the velocity at that coordinate position, the radius of gyration upon traverse, and the like.

A continuous path equation is computed from such path information. The vehicle 100 can transmit information such as the current vehicle position, goal, and the like to the management center 200.

Figure 12:
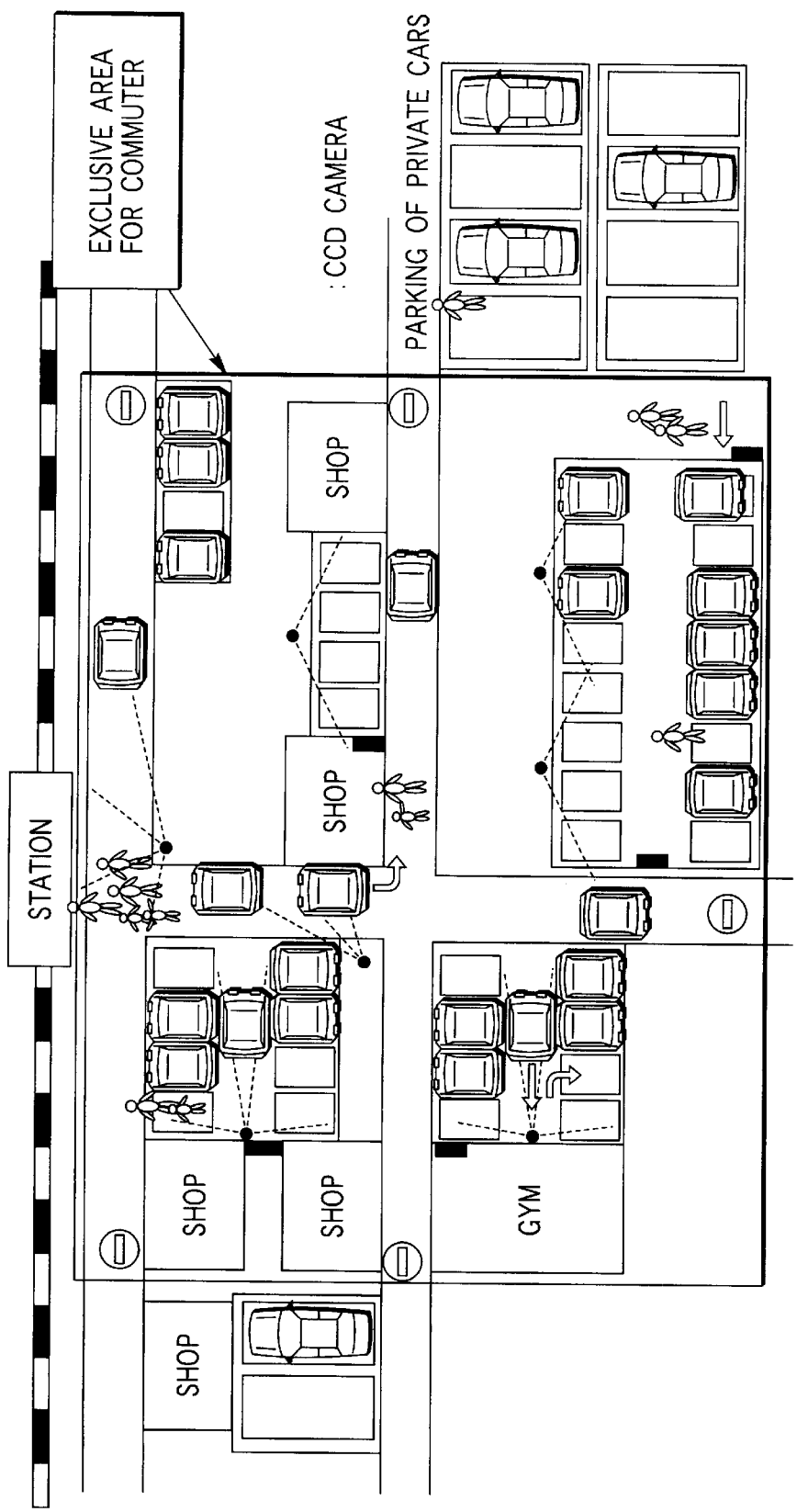
FIG. 12 shows an example of path information communications in the automatic travel control apparatus for a vehicle of the second embodiment.

That is, when there are many paths to the goal, and the passenger of the vehicle 100 designates the goal, the management center 200 that manages travel of the vehicle 100 designates an appropriate path and sends the path information to the vehicle 100, as shown in an example of path information communications shown in FIG. 12.

In this way, the vehicle 100 computes a path equation and velocity pattern to the goal by the aforementioned method, and can automatically travel.

As a method of designating a goal, the address, goal building name, place name, or point on the map may be designated.

(Third Embodiment)

In this embodiment, the path information obtaining unit 20 in the automatic travel control apparatus for a vehicle of the first embodiment comprises means for designating a goal to which the vehicle 100 is to travel, means for holding map information to the goal, and means for computing and selecting a path to the designated goal on the basis of the held map information. When the goal of the vehicle 100 is designated, path information to the goal is computed.

In the automatic travel control apparatus for a vehicle according to this embodiment with the above arrangement, when a goal is designated, path information including the coordinate positions of changes in path such as right and left traverses, lane change, and the like along the path to the goal, the velocity at that coordinate position, the radius of gyration upon traverse, and the like is computed, and a path equation is computed based on that information.

Figure 13:
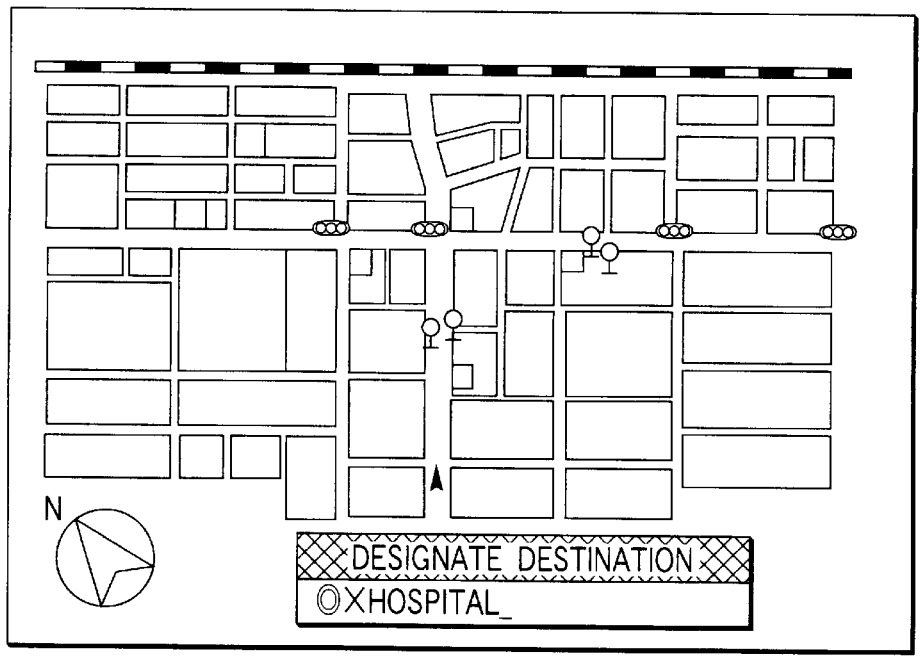
FIG. 13 shows an example of path information communications in an automatic travel control apparatus for a vehicle according to the third embodiment of the present invention.
Figure 14:
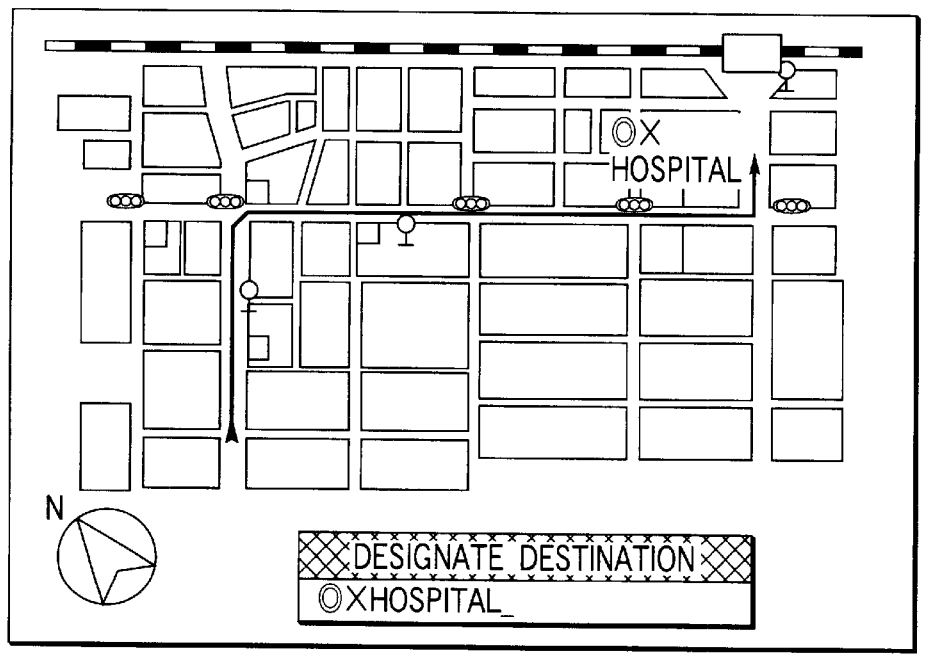
FIG. 14 shows an example of path information communications in the automatic travel control apparatus for a vehicle according to the third embodiment of the present invention.

More specifically, FIG. 13 shows an example of the screen of an onboard navigation system, and a goal is designated using such map information.

As a method of designating a goal, an address, goal building name, place name, or point on the map may be designated.

Then, a path to the designated goal is selected, and the path the vehicle 100 is to travel is computed using a continuous path equation.

Based on the path equation, the vehicle 100 can automatically travel by the method mentioned above.

(Fourth Embodiment)

Figure 15:
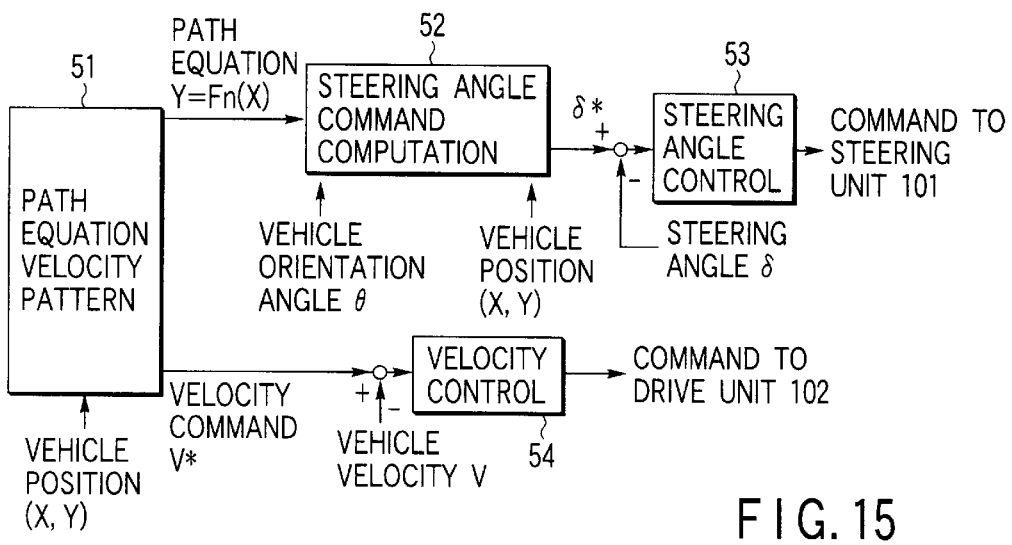
FIG. 15 is a block diagram showing an example of the arrangement of a steering control function of a steering drive control unit 50 in an automatic travel control apparatus for a vehicle according to the fourth embodiment of the present invention.
Figure 16:
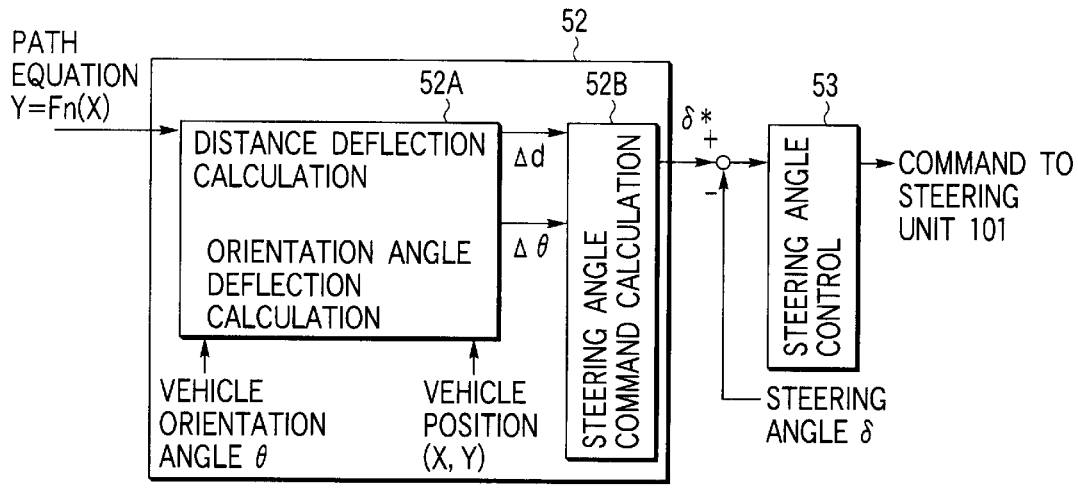
FIG. 16 is a block diagram showing an example of the detailed arrangement of a steering angle command computing unit 52 in the automatic travel control apparatus for a vehicle of the fourth embodiment.

FIG. 15 is a block diagram showing an example of the arrangement of the steering control function of the steering drive control unit 50 in an automatic travel control apparatus for a vehicle according to this embodiment, and FIG. 16 is a block diagram showing an example of the detailed arrangement of a steering angle command computing unit 52 in FIG. 15. The same reference numerals in FIGS. 15 and 16 denote substantially the same parts as those in FIGS. 2 and 10, a detailed description thereof will be omitted, and only differences will be explained.

More specifically, in this embodiment, the steering angle command computing unit 52 comprises a distance deflection orientation angle deflection calculation unit 52A and steering angle command calculation unit 52B, as shown in FIG. 16.

The distance deflection orientation angle deflection calculation unit 52A calculates a position deflection as a deflection between the path equation calculated by the path computing unit 30 and the current absolute position of the vehicle 100, and also calculates an orientation angle deflection as a deflection between the goal orientation angle of the vehicle in the path equation computed by the path computing unit 30, and the current absolute orientation angle of the vehicle 100.

The steering angle command calculation unit 52B calculates a steering angle command of the vehicle to make these positional deflection and orientation angle deflection closer to zero, and outputs the command to the steering angle control unit 53.

In the automatic travel apparatus for a vehicle of this embodiment with the above arrangement, the distance deflection orientation angle deflection calculation unit 52A calculates the distance deflection and orientation angle deflection between the current position and orientation angle of the vehicle 100 and a continuous path equation so as to calculate a steering angle command from the path equation and the current position of the vehicle 100.

Figure 17:
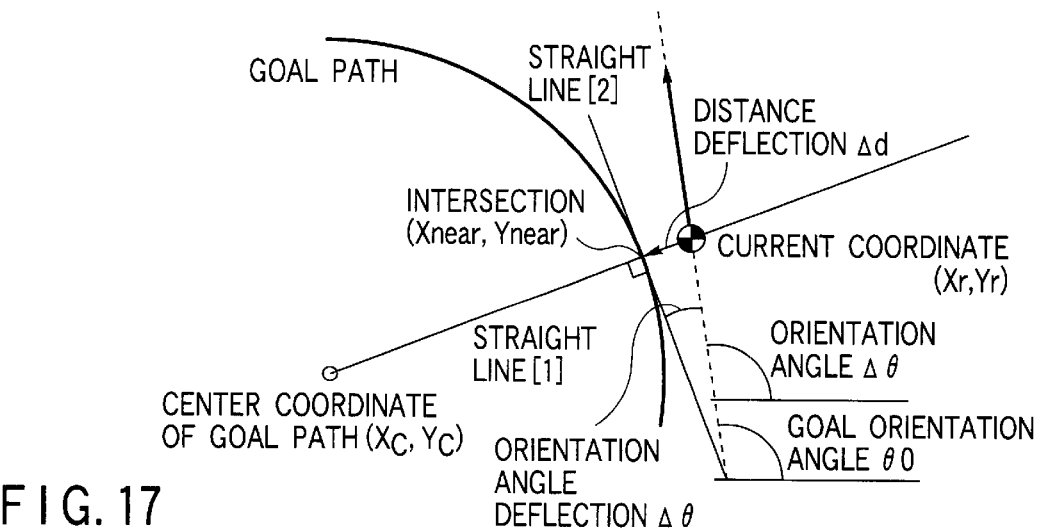
FIG. 17 shows the relationship (arc path) among the path equation, distance deflection, orientation angle deflection in the automatic travel control apparatus for a vehicle of the fourth embodiment.

For example, in case of a goal path expressed by an arc, as shown in FIG. 17, straight line [1] that passes through a central coordinate position $(X_C, Y_C)$ of the goal path equation Y=Fn(X) and the current vehicle coordinate position $(X_r, Y_r)$ is calculated, and a distance deflection Ad with respect to the goal path is computed on the basis of the distance between an intersection $(X_{near}, Y_{near})$ of straight line [1] and the goal path, and the vehicle coordinate position $(X_r, Y_r)$ An orientation angle deflection Δθ can be calculated from the difference between an orientation angle command at the intersection $(X_{near}, Y_{near})$ on the goal path, which is calculated using a slope from straight line [2] perpendicular to straight line [1] above, and the current orientation angle θ of the vehicle 100.

Figure 18:
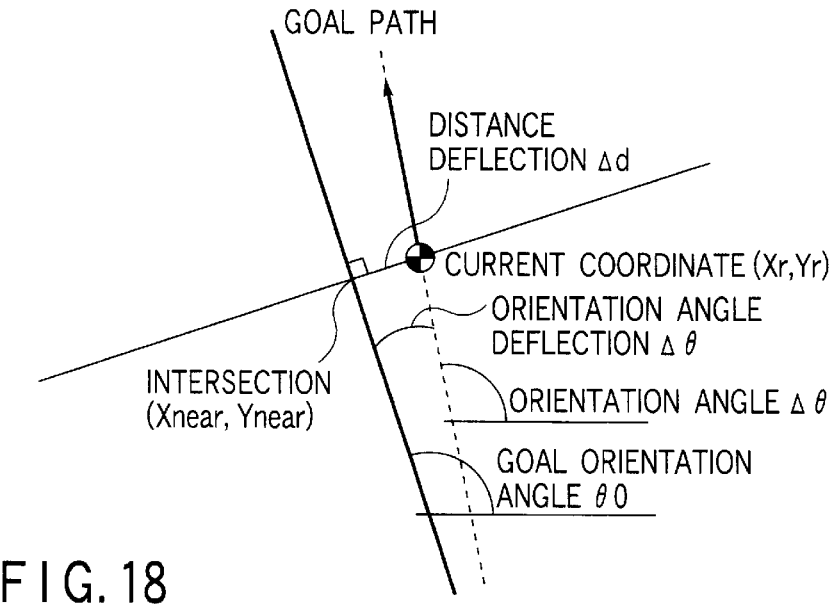
FIG. 18 shows the relationship (straight path) among the path equation, distance deflection, orientation angle deflection in the automatic travel control apparatus for a vehicle of the fourth embodiment.

For example, in case of the goal path expressed by a straight line, as shown in FIG. 18, a distance deflection Δd with respect to the goal path can be computed on the basis of the distance between straight line [3] which is perpendicular to the goal path equation Y=Fn(X) and passes through the current vehicle coordinate position $(X_r, Y_r)$ and the intersection $(X_{near}, Y_{near})$ with the goal path.

Using the two variables, i.e., the distance deflection and orientation angle deflection, the steering angle command of the vehicle 100 is computed to make the two variables become zero.

Figure 19:
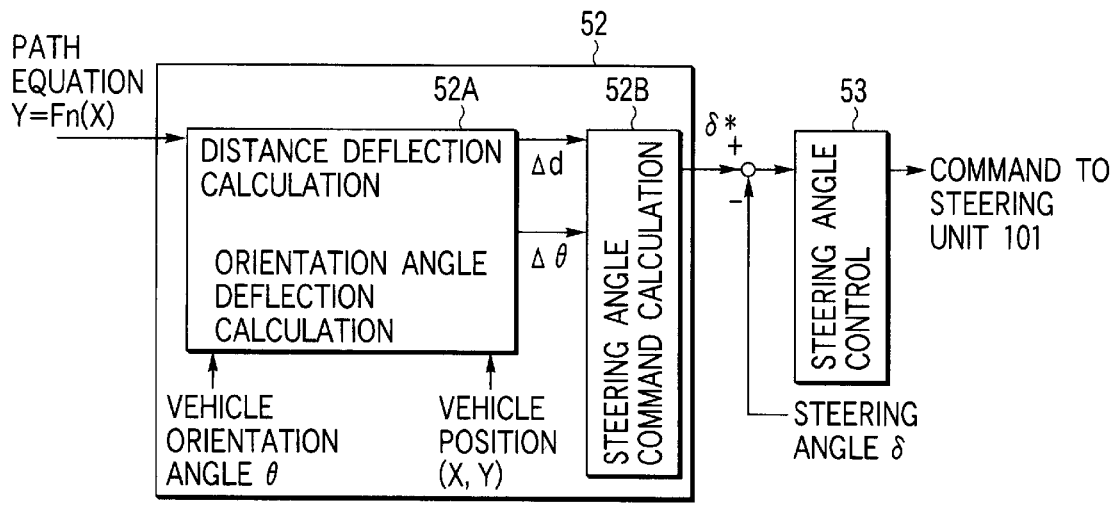
FIG. 19 is a block diagram showing a computation example of a steering angle command δ* in the automatic travel control apparatus for a vehicle of the fourth embodiment.

In this case, as a method of computing the steering angle command of the vehicle 100, for example, 2-input fuzzy reasoning shown in, e.g., FIG. 19 may be used.

In the feedback computation using fuzzy reasoning, since gains are variable, the position and orientation angle of the vehicle 100 can be controlled without any interference, and more stable travel control can be realized.

Note that the present invention does not particularly limit the fuzzy technique, but antecedent part membership functions may be set, as shown in FIGS. 20A and 20B, and a rule table shown in FIG. 21 may be used.

In FIGS. 20A to 21, N_length represents a negative distance deflection value; Z_length, a zero distance deflection value; P_length, a positive distance deflection value; N_angle, a negative orientation angle deflection value; Z_angle, a zero orientation angle deflection value; and P_angle, a positive orientation angle deflection value.

Variables expressed as shown in FIG. 21 mean Negative_Big (large negative value), Negative_Small (small negative value), Zero (zero), Positive_Small (small positive value), and Positive_Big (large positive value). In this case, as an example, since minimum values of two states to be compared are selected to determine the maximum value of a consequent part membership function, a Min-Max method is used.

In this manner, a consequent part membership function f(x) shown in FIG. 22 is obtained. The output of fuzzy reasoning is equal to the sum of sets of functions, i.e., an area.

However, since that area is not significant as a numerical value, a representative value is computed to obtain a steering angle command δ* as an output.

The steering angle control 53 is made using the steering angle command δ* obtained in this way and an actual steering angle δ to compute a command for the steering unit 101.

Since the steering angle of the vehicle 100 has nearly one-to-one correspondence with a steering wheel angle, the steering angle command may be converted into a steering wheel angle command.

(Another Embodiment)

The automatic travel control apparatus for a vehicle of the second embodiment mentioned above may further comprise means for transmitting travel path information including obstacle information such as accident information, roadwork information, and the like, which are associated with a leading vehicle, to the management center 200 as history information, and means for updating the information of the path the vehicle is to travel, which is to be supplied to a trailing vehicle.

In the automatic travel control apparatus for a vehicle according to this embodiment, when travel path information including obstacle information that pertains to a leading vehicle 100 is transmitted to the management center 200 as history information, the management center 200 updates information of a path a vehicle is to travel, which is to be supplied to a trailing vehicle 100, on the basis of the history information. Hence, obstacles upon travel that pertains to the leading vehicle 100 are reflected in travel control of the trailing vehicle 100, thus realizing highly reliable automatic travel of a vehicle that considers accidents, roadwork, and the like.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An automatic travel control apparatus for controlling a vehicle which mounts a controllable steering unit and drive unit to make it automatically travel according to a given path, comprising:

storage means for holding data which pertains to specifications and data of the vehicle;

path information obtaining means for obtaining path information including position, orientation, and velocity data of a path along which the vehicle is to travel;

path computing means for computing a path equation including equations of continuous straight lines and arcs and a velocity pattern, which pertain to automatic travel, on the basis of the data held by said storage means and the path information obtained by said path information obtaining means;

absolute position orientation angle detection means for detecting an absolute position and absolute orientation angle of the vehicle;

steering control means for controlling the steering unit to track the path on the basis of the path equation computed by said path computing means, and the absolute position and absolute orientation angle of the vehicle detected by said absolute position orientation angle detection means; and a drive control unit for controlling the drive unit to track the velocity pattern on the basis of the velocity pattern computed by said path computing means and a velocity of the vehicle, wherein said steering control means includes:

means for computing a positional deflection as a deflection between the path equation computed by said path computing means, and a current absolute position of the vehicle;

means for computing an orientation angle deflection as a deflection between a goal orientation angle of the vehicle in the path equation computed by said path computing means, and a current absolute orientation angle of the vehicle;

means for computing a steering angle command of the vehicle in accordance with the positional deflection and orientation angle deflection; and means for controlling a steering angle of the vehicle in response to the steering angle command of the vehicle.

2. An apparatus according to claim 1, wherein said path information obtaining means comprises:

a management center for managing travel of the vehicle, and supplying path information of the path the vehicle is to travel;

means for making two-way communications between said management center and the vehicle; and means for receiving the path information of the path the vehicle is to travel, which is supplied from said management center, and when the vehicle transmits information such as a current vehicle position, goal, and the like to said management center, said management center transmits path information to the goal to the vehicle.

3. An apparatus according to claim 1, wherein said path information obtaining means comprises:

means for designating a goal to which the vehicle is to travel;

means for holding map information to the goal; and means for computing and selecting a path to the designated goal on the basis of the held map information, and when a goal of the vehicle is designated, path information to the goal is computed.

4. An apparatus according to claim 1, wherein said means for computing the steering angle command computes the steering angle command in such a manner as to make the positional deflection and orientation angle deflection close to zero.

5. An apparatus according to claim 2, further comprising:

means for transmitting travel path information including obstacle information such as accident information, roadwork information, and the like, which are associated with a leading vehicle, to said management center as history information; and means for updating path information of the path the vehicle is to travel, which is to be supplied to a trailing vehicle, on the basis of the transmitted history information.

6. An apparatus according to claim 1, wherein a feedback computation upon controlling the steering unit to track the path equation or upon controlling the drive device to track the velocity pattern uses fuzzy reasoning.

7. An apparatus according to claim 2, wherein a feedback computation upon controlling the steering unit to track the path equation or upon controlling the drive device to track the velocity pattern uses fuzzy reasoning.

8. An apparatus according to claim 3, wherein a feedback computation upon controlling the steering unit to track the path equation or upon controlling the drive device to track the velocity pattern uses fuzzy reasoning.

9. An apparatus according to claim 4, wherein a feedback computation upon controlling the steering unit to track the path equation or upon controlling the drive device to track the velocity pattern uses fuzzy reasoning.

10. An automatic travel control apparatus for controlling a vehicle which mounts a controllable steering unit and drive unit to make it automatically travel according to a given path, comprising:

storage means far holding data which pertains to specifications and data of the vehicle;

path information obtaining means for obtaining path information including position, orientation, and velocity data of a path along which the vehicle is to travel;

path computing means for computing a path equation including equations of continuous straight lines and arcs and a velocity pattern, which pertain to automatic travel, on the basis of the data held by said storage means and the path information obtained by said path information obtaining means;

absolute position orientation angle detection means for detecting an absolute position and absolute orientation angle of the vehicle;

steering control means for controlling the steering unit to track the path on the basis of the path equation computed by said path computing means, and the absolute position and absolute orientation angle of the vehicle detected by said absolute position orientation angle detection means; and a drive control unit for controlling the drive unit to track the velocity pattern on the basis of the velocity pattern computed by said path computing means and a velocity of the vehicle, wherein said steering control means includes:

means for computing a positional deflection as a deflection between the path equation computed by said path computing means, and a current absolute position of the vehicle;

means for computing an orientation angle deflection by obtaining an intersection point of the goal path and a straight line which is perpendicular to the goal path and passes the current absolute position of the vehicle, and calculating an orientation angle deflection in accordance with an angular difference between a goal orientation angle of the vehicle at the intersection point and the current absolute orientation angle of the vehicle;

means for computing a steering angle commend of the vehicle in accordance with the positional deflection and orientation angle deflection; and means for controlling a steering angle of the vehicle in response to the steering angle command of the vehicle.

11. An apparatus according to claim 10, wherein said path information obtaining means comprises:

a management center for managing travel of the vehicle, and supplying path information of the path the vehicle is to travel;

means for making two-way communications between said management center and the vehicle; and means for receiving the path information of the path the vehicle is to travel, which is supplied from said management center, and when the vehicle transmits information including a current vehicle position and a goal to said management center, said management center transmits path information to the goal to the vehicle.

12. An apparatus according to claim 10, wherein said path information obtaining means comprises:

means for designating a goal to which the vehicle is to travel;

means for holding map information to the goal; and means for computing and selecting a path to the designated goal on the basis of the held map information; and when a goal of the vehicle is designated, path information to the goal is computed.

13. An apparatus according to claim 10, wherein said means for computing the steering angle command computes the steering angle command in such a manner as to make the positional deflection and orientation angle deflection close to zero.

14. An apparatus according to claim 11, further comprising:

means for transmitting travel path information including accident information and road work information which are associated with a leading vehicle, to said management center as history information; and means for updating path information of the path the vehicle is to travel, which is to be supplied to a trailing vehicle on the basis of the transmitted history information.

15. An apparatus according to claim 10, wherein at least one of said steering control means and said drive control unit comprises fuzzy reasoning feedback computation means.

16. An apparatus according to claim 11, wherein at least one of said steering control means and said drive control unit comprises fuzzy reasoning feedback computation means.

17. An apparatus according to claim 12, wherein at least one of said steering control means and said drive control unit comprises fuzzy reasoning feedback computation means.

18. An apparatus according to claim 13, wherein at least one of said steering control means and said drive control unit comprises fuzzy reasoning feedback computation means.

* * * * *